United States Patent Office 3,489,942
Patented Jan. 13, 1970

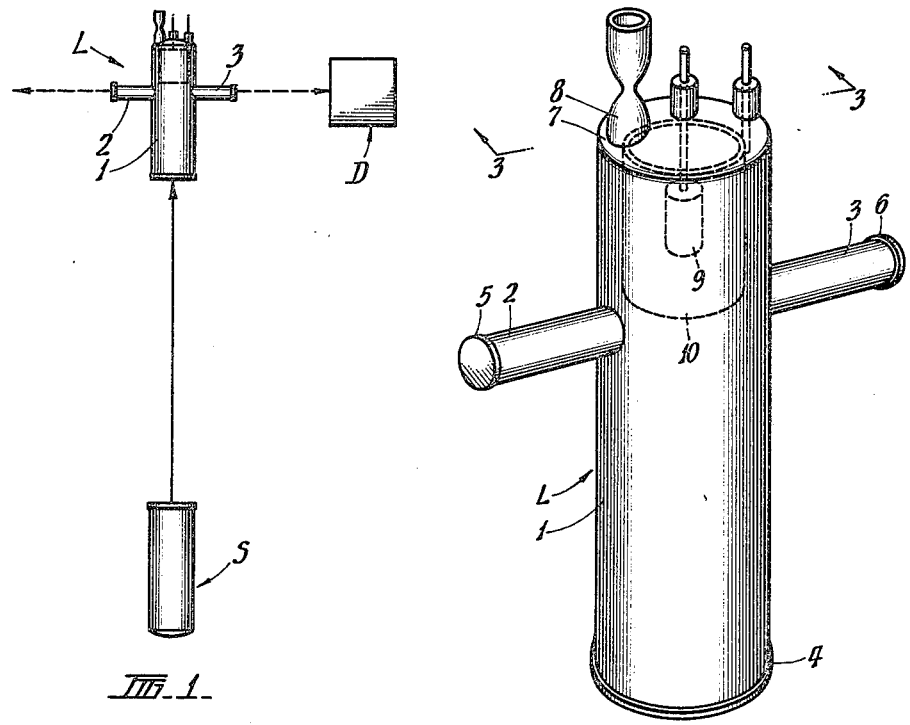
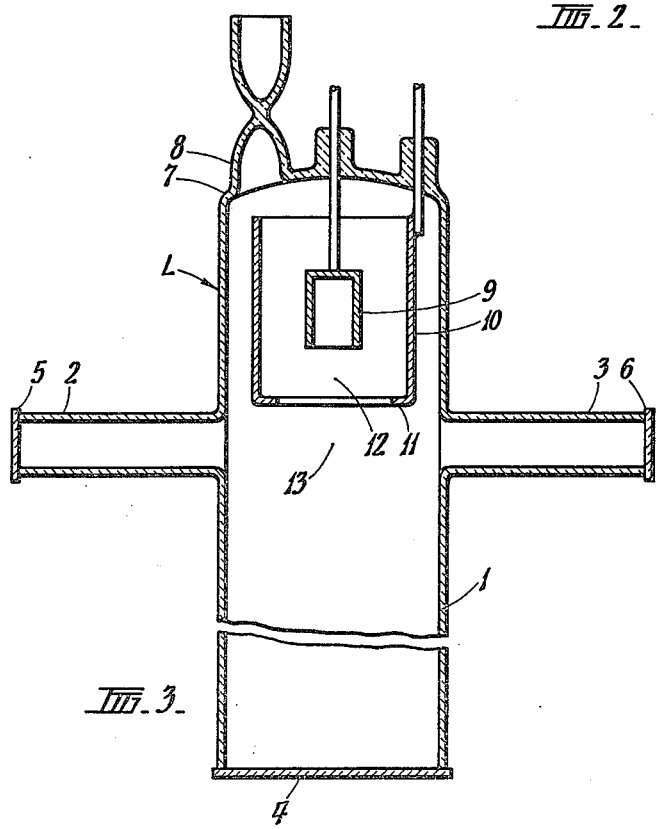

3,489,942
RESONANCE SPECTRAL LAMP
Alan Walsh, East Brighton, Victoria, and John Vincent Sullivan, Carnegie, Victoria, Australia, assignors to Commonwealth Scientific and Industrial Research Organization, East Melbourne, Victoria, Australia
Filed June 5, 1964, Ser. No. 372,772
Claims priority, application Australia, June 12, 1963, 31,733/63
Int. Cl. H01j 17/04, 61/04
U.S. Cl. 313—209                    5 Claims

ABSTRACT OF THE DISCLOSURE

This invention relates to spectrophotometric techniques and apparatus whereby atomic resonance spectral lines can be selectively generated or detected with respect to all other atomic spectral lines. The invention therefore has application both as a means for generating a reference spectral line and as a monochromator capable of isolating specific spectral line(s) from radiation at all other wavelengths. Since the present invention deals exclusively with resonance lines, it has particular application in atomic absorption spectroscopy where a resonance lamp constructed in accordance with the present invention may be employed in place of the conventional monochromator.

The method of the present invention involves generating an atomic vapour of a given element by cathodic sputtering in a gaseous discharge lamp, directing an incident beam of radiation containing the desired resonance line (the line concerned being characteristic of the given element) at the atomic vapour, and then detecting the radiation which is emitted by the atomic vapour in a direction substantially at right angles to the incident beam. The present invention also includes a resonance lamp suitable for use in the above described method.

BACKGROUND OF THE INVENTION

This invention relates to the selective emission and detection of selected atomic spectral lines, which will be referred to as resonance lines, and to apparatus for such selective emission and detection. These effects and techniques find application in many fields of spectroscopy, particularly atomic absorption spectroscopy, and also provide a method whereby convenient sources of reference spectra for wave-length calibration or for the identification of atomic spectral lines may be provided.

It is well known that, if radiation from an atomic spectral light source characteristic of a given element or elements is allowed to fall on an atomic vapour of the same element or elements, selected lines in the spectrum emitted by the light source will be partially absorbed by the atomic vapour. For the purposes of this specification such lines will be referred to as atomic resonance lines. It is further known that, if the atomic vapour is under the right physical conditions of temperature, pressure, etc., some of the radiation which is absorbed by the atomic vapour will be re-emitted in all directions. This re-emitted radiation is known as resonance radiation.

This effect has been used to isolate atomic resonance lines of elements such as sodium and mercury, because the necessary atomic vapours from such elements can be produced thermally, and intense sodium and mercury lamps are available. However, it has not been possible to use this effect for elements which have a low vapour pressure, since it has not hitherto been possible to produce light sources which emit resonance lines which are sufficiently intense and sufficiently narrow, nor has it been possible to devise sufficiently simple equipment to produce the necessary atomic vapours for the absorption of the radiation.

SUMMARY OF THE INVENTION

It is the main object of the present invention to provide a technique whereby the atomic resonance lines of a wide range of elements can be produced and isolated from non-resonance lines, and to provide apparatus whereby this technique can be utilized in practice.

The present invention provides a method for selecting or isolating, from incident radiation, radiation having the wavelength or wavelengths of the resonance spectral line or lines of a given chemical element, said method comprising the steps of: generating a gaseous electrical discharge in a vessel containing an inert gas at low pressure by employing a cathode formed from said chemical element so as to thereby generate, by cathodic sputtering a cloud of the atomic vapour of said element in the vicinity of said cathode; directing the incident radiation into the vessel so as to impinge on said cloud of atomic vapour in the vicinity of said cathode; and detecting radiation which emerges from said cloud in a direction which is substantially different from the path of the incident radiation.

The invention further includes apparatus for carrying out the method referred to above, which comprises a resonance spectral lamp for selectively emitting the resonance spectral line or lines characteristic of a given chemical element, the lamp comprising: a hermetically sealed envelope containing a rare gas at low pressure; a first window in said envelope transparent to radiation at the wavelength of said resonance spectral line or lines; an electrode assembly mounted within said envelope opposite said first window, said electrode assembly including an anode and a cathode formed at least in part from the given chemical element; and a second window in said envelope also transparent to radiation at the wavelength of said resonance spectral line or lines, said second window being located intermediate of the cathode and the first window so as to face away from a line joining the first window to the cathode.

In order that the invention may be more fully and completely understood, a presently preferred form of apparatus in accordance with the invention will be described by way of an example, illustrating how the novel technique can be applied for the selective emission and/or the selective detection of the resonance lines of a given metal, in this case copper.

An atomic spectral lamp of high intensity, e.g. of the type described in our copending U.S. patent application Ser. No. 314,350, filed Oct. 7, 1963, now abandoned, is used to emit radiation characteristic of copper, and this radiation is allowed to fall on a vapour of copper atoms contained in a resonance lamp and which have been produced at least in part by cathodic sputtering from a hollow cathode by means of an electrical discharge, the cathode being made of, or containing copper. When the radiation from the atomic spectral lamp falls on the atomic vapour, the only lines which are absorbed by the vapour are atomic resonance lines of copper. Some of the absorbed radiation is subsequently re-emitted in all directions and it is this re-emitted radiation which is being made use of in the present case, since it effectively isolates the resonance lines of copper from any other atomic spectral lines which may be present in the radiation.

An obvious extension of this technique is to modulate the light emitted by the spectral lamp and to produce the atomic vapour in the resonance lamp by a D.C. discharge having no alternating component. Thus the re-emitted radiation will be modulated and by using an A.C. detection system which rejects all signals which are unmodulated any radiation emitted by the discharge producing the metal atoms does not interfere with the detection of the re-emitted radiation.

Alternatively, the resonance lamp can be used alone as a detector of resonance lines in the spectrum emitted by any light source. Radiation from the source is passed into the resonance lamp and any resonance radiation emitted by the atomic vapour being produced in the lamp is detected and/or measured by suitable known means.

Because of the highly selective nature of the resonance absorption/emission phenomenon it is thus possible to isolate and detect resonance lines in complex spectra containing large numbers of spectral lines of different elements.

BRIEF DESCRIPTION OF THE DRAWINGS

Reference will now be made to the accompanying drawings in which—

FIGURE 1 is a diagrammatic representation of an apparatus for the selective emission and detection of resonance lines in atomic spectra, in accordance with the invention;

FIGURE 2 is a detailed perspective view of a preferred form of resonance lamp for producing an atomic vapour; and FIGURE 3 is a sectional view along the line 3—3 in FIGURE 2.

DETAILED DESCRIPTION OF THE INVENTION

The resonance lamp L (as shown in FIGURES 2 and 3) comprises a generally cylindrical glass envelope 1, with two diametrically opposed side arms 2, 3. One end surface 4 of the envelope 1 and the end surfaces 5, 6 of the side arms 2, 3 serve as windows for radiation to enter or leave the envelope 1. A pair of electrodes are mounted and sealed in the other end surface 7 of the envelope 1, which also accommodates an evacuating passage 8.

The electrodes of the lamp are made in the form of two hollow concentric cylinders 9, 10. The inner cylinder 9 normally constitutes the cathode and is made wholly or partly of the element the vapour of which is to be produced by the lamp. The outer cylinder 10 is usually the anode and is somewhat longer than the inner cylinder 9. The end of the cylinder 10 which is nearest the window 4 is partly closed by an annular flange 11. Apart from its electrical function as the anode the cylinder 10 also serves as a shield to prevent stray radiation from the cathode 9 being transmitted down the side arms 2, 3 and through the windows 5, 6.

The lamp is prepared for use by evacuating the envelope through the passage 8, filling the envelope with a rare gas or a mixture of such gases at a pressure of the order of 1 mm. of mercury, and carrying out the normal "outgassing" and other standard discharge tube conditioning procedures prior to sealing the passage 8.

In use, a potential of several hundred volts is applied between the cathode 9 and the anode 10. This has the effect of striking up an electrical discharge between these two electrodes which is maintained by a discharge current which is usually in the range of 1–100 ma. Under the conditions stated above the discharge gives rise to cathodic sputtering, i.e. atoms leave the cathode 9 and form a cloud of atomic vapour in the inter-electrode space 12. This phenomenon is known as a "hollow cathode discharge" since, when viewed through the end window 4, the inside of the cathode 9 appears luminous. Light from this source is prevented from entering the side arms 2, 3 by the anode 10 and especially its shielding flange 11, as mentioned above. The atomic vapour cloud so formed extends beyond the confines of the anode or shield 10 and some of it occupies the space 13 between the two side arms 2, 3.

When radiation from the source S (see FIGURE 1), which is characteristic of the element or elements comprising the cathode, passes through the end window 4, at least a part of it is absorbed by the vapour cloud in the space 13. Some of this radiation is re-emitted as previously described and a portion of the re-emitted radiation emerges, through either of the windows 5, 6 at the ends of the side arms 2, 3. Due to the presence of the shielding anode 10 and the general configuration of the discharge lamp, radiation from the source S and from the cathode 9 is prevented from entering directly into the side arms 2, 3 and emerging from the windows 5, 6, as already explained.

Generally only the resonance radiation emerging from one of the windows e.g. 5 is utilised, the function of the side arm 3 and the other window 6 is to prevent scattered radiation being recircled from the walls of the envelope 1 and out through the window 5.

Thus the radiation emitted through the windows 5, 6 consists only of the atomic resonance lines of copper (i.e. the element of which the cathode is made), and can be used as a light source for such lines, e.g. the resonance lamp L, in connection with a suitable light source S can be used as a source of essentially monochromatic radiation or at least radiation comprising a few intense lines which can readily be separated by a simple monochromator. Thus the apparatus in one form can be used as a combined source and monochromator for the production of radiation consisting of one or more resonance lines.

Alternatively the resonance lamp L may function as a sensitive monochromator-detector for the detection and identification of atomic spectra in radiation from any source. In this case, S represents any source of radiation containing elemental lines, such as a flame or lamp or even a stellar or solar source. As the resonance lamp only re-emits the resonance lines of the element or elements comprising its cathode, the detection of the element or elements concerned in a complex spectrum can be greatly facilitated. Detection and measurement of the resonance radiation emitted from the lamp is performed by a detector D.

By eliminating the necessity for narrow slits and complex optical paths the apparatus can provide a source of resonance radiation of comparatively high intensity and wide aperture, and also a detector of wide aperture and correspondingly high sensitivity.

The techniques described above, because of their simplicity, have proved to be very valuable and useful in all kinds of spectroscopic work and particularly in the field of atomic absorption spectroscopy. It is thus considered that they constitute a worthwhile improvement over the known prior art in this field.

It will be apparent to those skilled in the art that with some elements, the conditions required for the production of an atomic vapour by cathodic sputtering will also result in a certain amount of such vapour being produced by thermal excitation. This effect is usually small with respect to the cathodic sputtering effect. It is therefore to be understood that the invention includes the production of an atomic vapour by a combination of the cathodic sputtering phenomenon with any accompanying effect such as thermal excitation.

We claim:

1. A resonance spectral lamp for selectively emitting the resonance spectral line or lines characteristic of a given chemical element, comprising a hermetically sealed envelope containing a rare gas at low pressure, a first window in said envelope transparent to radiation at the wave length of said resonance spectral line or lines, an electrode assembly mounted within said envelope opposite said first window, said electrode assembly including a cathode formed at least in part from the given chemical element and an anode, a tubular side arm extending outwardly from and disposed in communication with the interior of said envelope adjacent said electrode assembly, said side arm having a longitudinal axis orthogonal to a straight line joining said first window and said electrode assembly, and a second window in the end of said side arm remote from said envelope also transparent to radiation at the wavelength of said resonance spectral line or lines.

2. A resonance spectral lamp according to claim 1 wherein said cathode is a hollow tubular cathode having an open end arranged so that its axis passes through said first window and so that said open end faces said first window.

3. A resonance spectral lamp according to claim 2 further comprising a second tubular side arm extending outwardly from and disposed in communication with the interior of said envelope, said second side arm having a longitudinal axis disposed in alignment with the longitudinal axis of the first-mentioned tubular side arm, and a third window in the end of said second side arm remote from said envelope also transparent to radiation at the wave length of said resonance spectral line or lines.

4. A resonance spectral lamp according to claim 2 wherein said anode is tubular and provided with an open end facing said first window, said cathode being mounted within said anode with the open end of said anode being closer to said first window than the open end of said cathode to prevent light from said electrode assembly passing down said side arms.

5. A resonance lamp according to claim 4 wherein said tubular anode is provided with an in-turned flange on the open end thereof to assist in preventing light from entering said side arms.

References Cited

UNITED STATES PATENTS

| | | |
|---|---|---|
| 3,190,172 | 6/1965 | Langberg. |
| 1,118,868 | 11/1914 | Kerschbaum _____ 250—71 X |
| 2,491,867 | 12/1949 | Lemmers _____ 313—209 X |
| 2,847,899 | 8/1958 | Walsh. |
| 3,242,371 | 3/1966 | Sugawara et al. ____ 313—209 X |
| 3,264,511 | 8/1966 | Yamasaki _____ 313—209 |

OTHER REFERENCES

Russell et al.: "Resonance Radiation From a Hollow Cathode," Spectrochimica Acta, vol. 10, 1959, pp. 883–885.

Gatehouse et al.: "Analysis of Metallic Samples by Atomic Absorption Spectroscopy," Spectrochimica Acta, vol. 16, 1960, pp. 602–604.

RONALD L. WIBERT, Primary Examiner

F. L. EVANS, Assistant Examiner

U.S. Cl. X.R.

313—223, 224, 225; 356—74, 85, 99